United States Patent
Yamamoto et al.

(10) Patent No.: US 9,145,062 B2
(45) Date of Patent: *Sep. 29, 2015

(54) CHARGE CONTROL DEVICE FOR VEHICLE

(75) Inventors: Naoki Yamamoto, Kawasaki (JP); Kazuhiko Okino, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 281 days.

This patent is subject to a terminal disclaimer.

(21) Appl. No.: 13/818,060

(22) PCT Filed: Mar. 1, 2012

(86) PCT No.: PCT/JP2012/055207
§ 371 (c)(1),
(2), (4) Date: Feb. 20, 2013

(87) PCT Pub. No.: WO2012/124488
PCT Pub. Date: Sep. 20, 2012

(65) Prior Publication Data
US 2013/0147432 A1 Jun. 13, 2013

(30) Foreign Application Priority Data
Mar. 11, 2011 (JP) ................... 2011-054092

(51) Int. Cl.
*H02J 7/00* (2006.01)
*B60L 11/18* (2006.01)
(Continued)

(52) U.S. Cl.
CPC .............. *B60L 11/1809* (2013.01); *B60L 1/02* (2013.01); *B60L 11/1803* (2013.01); *B60L 11/1816* (2013.01); *B60L 11/1875* (2013.01); *H01M 10/443* (2013.01); *H01M 10/486* (2013.01); *H01M 10/615* (2015.04); *H01M 10/63* (2015.04); *H01M 10/66* (2015.04); *H02J 7/0068* (2013.01); *H02J 7/0073* (2013.01); *B60L 2210/10* (2013.01); *B60L 2240/545* (2013.01);
(Continued)

(58) Field of Classification Search
CPC . H01M 10/44; H01M 10/5006; H02J 7/0021; H02J 7/0054; H02J 7/025; H02J 7/0068
USPC ................................... 320/104, 109
See application file for complete search history.

(56) References Cited

U.S. PATENT DOCUMENTS 5,329,219 A * 7/1994 Garrett ........................ 320/150
5,650,710 A   7/1997 Hotta
(Continued)

FOREIGN PATENT DOCUMENTS

JP  07-073906 A  3/1995
JP  08-115747 A  5/1996
(Continued)

OTHER PUBLICATIONS

Chinese Office Action, Oct. 10, 2014, 6 pages.
(Continued)

*Primary Examiner* — Nghia Doan
(74) *Attorney, Agent, or Firm* — Foley & Lardner LLP

(57) ABSTRACT

A charge control device is configured to delay a charge suspension time if a battery is being heated by a battery heater when carrying out a timed charge in a charge time slot specified by a user via an interface device. This enables the battery to be charged to a target charge amount without increasing a required capacity of the battery heater.

4 Claims, 5 Drawing Sheets

(51) Int. Cl.
| | |
|---|---|
| *H01M 10/44* | (2006.01) |
| *H01M 10/48* | (2006.01) |
| *B60L 1/02* | (2006.01) |
| *H01M 10/63* | (2014.01) |
| *H01M 10/615* | (2014.01) |
| *H01M 10/66* | (2014.01) |

(52) U.S. Cl.
CPC ........ *B60L 2240/662* (2013.01); *Y02T 10/7005* (2013.01); *Y02T 10/705* (2013.01); *Y02T 10/7216* (2013.01); *Y02T 10/7291* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 8,890,467 | B2 * | 11/2014 | Almquist et al. | 320/104 |
| 2008/0036425 | A1 * | 2/2008 | Tashiro et al. | 320/154 |
| 2010/0217485 | A1 | 8/2010 | Ichishi | |
| 2013/0162027 | A1 | 6/2013 | Yamamoto et al. | |
| 2014/0002025 | A1 | 1/2014 | Yamamoto et al. | |

FOREIGN PATENT DOCUMENTS

| | | |
|---|---|---|
| JP | 11-150885 A | 6/1999 |
| JP | 2000-040536 A | 2/2000 |
| JP | 2009-136109 A | 6/2009 |
| JP | 2011-238428 A | 11/2011 |
| JP | 2012-029491 A | 2/2012 |
| WO | WO-2008/155977 A1 | 12/2008 |
| WO | WO 2010/038682 A1 | 4/2010 |

OTHER PUBLICATIONS

USPTO Office Action, U.S. Appl. No. 14/004,096, Feb. 20, 2015, 11 pages.
USPTO Notice of Allowance, U.S. Appl. No. 14/004,096, Jun. 12, 2015.
USPTO Office Action (US 2005/0264257, US 2010/0292855, US 2010/0324765, US 2011/0316486, US 2013/0183554), U.S. Appl. No. 13/822,256, Jun. 19, 2015.

* cited by examiner

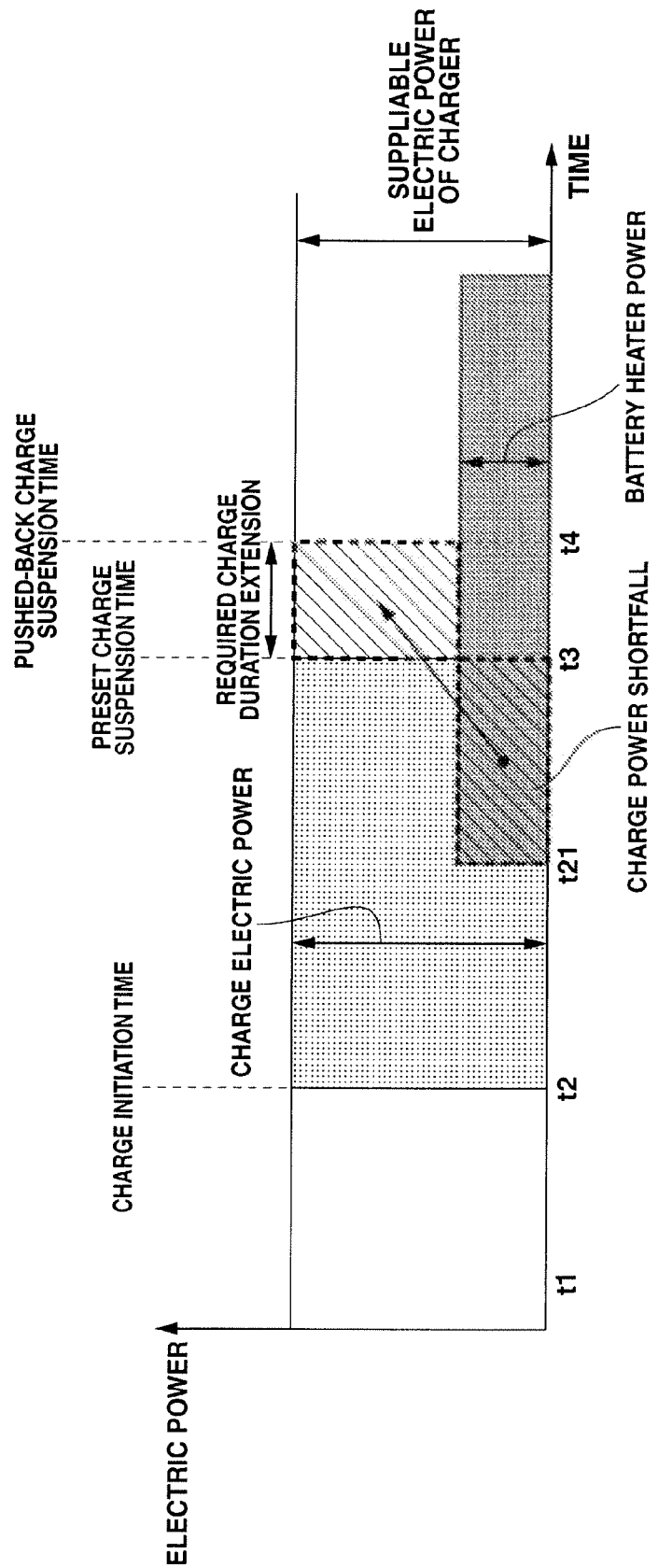

CHARGE CONTROL DEVICE FOR VEHICLE

TECHNICAL FIELD

The present invention relates to a charge control device for a vehicle that can run, using electric power of a battery.

BACKGROUND ART

A technology, by which a charge control of a battery is performed in a vehicle that can run, using electric power of the battery, has been disclosed in Patent document 1. This patent official gazette teaches that the battery is pre-heated by a heater before a charge initiation time specified beforehand such that the battery charging can be completed within a given time duration, when it has been determined that the battery charging cannot be completed within the given time duration by a charge time duration lengthened due to a temperature fall in the battery.

However, in order for the heating of the battery to be completed before the charge initiation time, the battery has to be heated up to a predetermined battery temperature for a short time. For instance, when heating a large capacity of battery, which battery is used as a propelling electric-power source, a high heater's capacity to heat the battery is required. Thus, this leads to a problem of increased costs.

CITATION LIST

Patent Literature

Patent document 1: Japanese patent provisional publication No. 08-115747 (A)

SUMMARY OF INVENTION

It is, therefore, in view of the previously-described drawbacks of the prior art, an object of the invention to provide a charge control device for a vehicle, which control device enables the charging of a battery to be completed, without increasing a required heater's capacity.

In order to accomplish the aforementioned and other objects, according to the charge control device for the vehicle of the present invention, a charge suspension time is delayed, if a battery is being heated when carrying out a timed charge in a time slot specified by a user with a timed charge reservation means.

Hence, even when a charge power drop occurs due to the concurrency of the timed charge and the heating of the battery, it is possible to appropriately extend the charge time duration by virtue of the delayed charge suspension time, thus avoiding a charge power shortfall. Additionally, the heating of the battery can be carried out during the timed charge, thereby eliminating the necessity of increasing a required heater's capacity, and thus avoiding costs from being increased.

BRIEF DESCRIPTION OF DRAWINGS

FIG. 5 is a time chart illustrating another example of the timed-charge period control processing of the first embodiment.

DESCRIPTION OF EMBODIMENTS

First Embodiment

Figure 1:
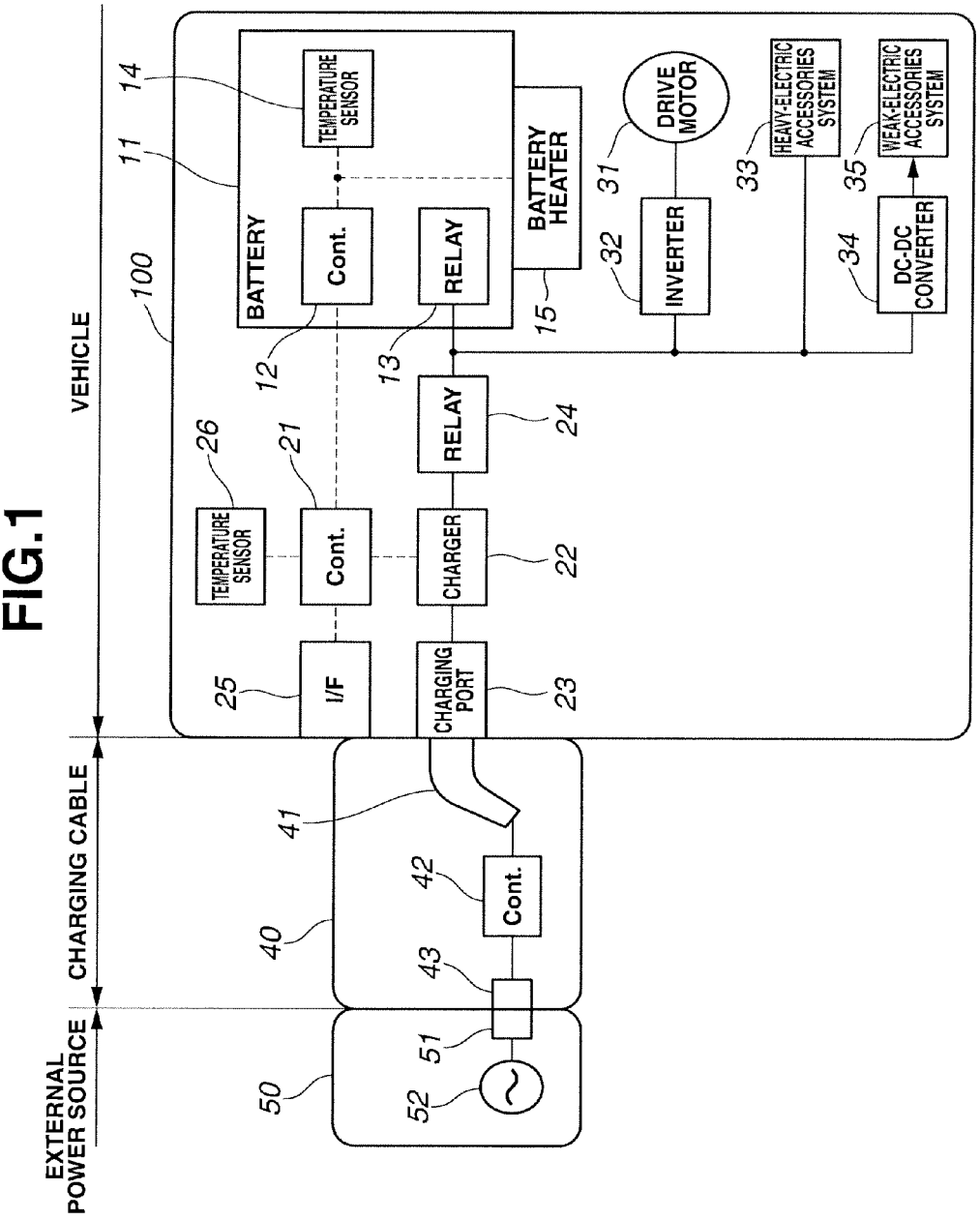
FIG. 1 is a system diagram illustrating a first embodiment of a charge control device for a vehicle.

FIG. 1 is the system diagram illustrating a charge control device for a vehicle of the first embodiment. The vehicle of the first embodiment is an electric vehicle, which can run, using only a battery as energy. An electrically-driven vehicle 100 has a chargeable/dischargeable battery 11. A direct-current (DC) power, stored in the battery 11, is converted into an alternating-current (AC) power by means of an inverter 32. The converted power is supplied to a drive motor 31 to drive the vehicle. By connecting the electrically-driven vehicle 100 to an external power source 50 via a charging cable 40, battery 11 receives electric power from the external power source such that the battery is recharged. Regarding the sort of external power source 50, generally, in the case of normal charge, a commercial power supply is used. In the case of quick charge, a quick charger is used. FIG. 1 shows a normal-charge form. Electric power of a commercial power supply 52 can be fed by a power receptacle 51.

Charging cable 40 is constructed by a power-supply plug 43, which is connectable to the power receptacle 51, a control box 42 having a function that interrupts an electric wiring when a system electric leakage has been detected during charging and a function that feeds a current-capacity signal to the vehicle, and a charging connector 41 configured to be connectable to a charging port 23 of the electrically-driven vehicle 100. When the external power source 50 and the electrically-driven vehicle 100 are connected to each other via the charging cable 40, a charge controller 21 starts up. Then, the charge controller determines, based on a set charge mode, whether the charging should be initiated. Charge modes are classified into a prompt charge mode in which the charging is initiated promptly and a timed charge mode in which a charge initiation and/or a charge suspension is performed on the basis of a preset charge initiation time and/or a preset charge suspension time.

In the case of such a charge initiation, a battery relay 13 and a charge relay 24 become both on and thus the connection between them becomes established, a charger 22 recognizes, based on a current-capacity signal outputted from the control box 42, a current capacity of the charging cable 40, and controls an input current from the external power source 50 within the recognized current capacity. The AC power (voltage×electric current), inputted into the charger 22, is converted into a DC power by the charger 22, and its voltage level is stepped up, and then the DC power of the step-up voltage is outputted. The electric power that the charger 22 outputs is controlled in real time by means of the charge controller 21. The output electric power is determined depending on a charge power required by a battery controller 12 for charging the battery 11, a largest possible electric power that the charger 22 can output, and an accessories-consumed electric power that is consumed by a heavy-electric accessories system 33, a DC-DC converter 34, and a weak-electric accessories system 35. By the way, DC-DC converter 34 is configured to step down a voltage and also configured to supply the DC power having the step-down voltage to the weak-electric accessories system 35.

During charging, battery controller 12 (corresponding to a battery control means) monitors various battery conditions, such as a state of charge (SOC), a voltage, and a temperature of the battery 11, and determines, based on these monitored conditions, a required charge power, and thus sends information about the required charge power to the charge controller 21. Particularly, if a charge suspension time and/or a charge amount is not specified, electric power supply to the battery 11 is continued until such time that the battery has been fully charged. During such a fully-charging action, the battery controller 12 performs a determination about a fully-charged condition on the basis of the SOC and the voltage of the battery 11. Then, the battery controller imposes a charge-suspension requirement on the charge controller 21, such that the charge controller 21 suspends the charging action. In the case of such a charge suspension, the connection of the battery relay 13 and the charge relay 24 becomes interrupted under a condition where a charge power, inputted into or outputted from the charger 22, is controlled to zero.

In the case of a timed charge, the charge controller 21 (corresponding to a charge control means) determines a charge initiation time and/or a charge suspension time on the basis of information about a preset charge initiation time and/or a preset charge suspension time. The charge controller is also configured to stop or disable the operation of the charge system until the determined charge initiation time even with the charging cable 40 already connected in the case of the determined charge initiation time later than the current time. By the way, in setting information about the charge initiation time and/or the charge suspension time for the timed charge, for instance, there are two methods, one being a method that the charge controller 21 memorizes such information directly inputted by a user with an interface device 25 (corresponding to a timed charge reservation means), and the other being a method that the vehicle determines a charge initiation time and/or a charge suspension time by selecting an arbitrary one from a plurality of preset charge modes by a user. Also provided is an outside air temperature sensor 26 for detecting an outside air temperature.

By the way, battery 11 has a property that, when the battery temperature falls, a fall in the chargeable capacity and/or a fall in the permissible charge current takes place and thus a charge time duration tends to become lengthened. Therefore, in order to heat or keep the battery 11 warm than a predetermined temperature, a battery heater 15 is mounted. Battery 11 is provided with a battery temperature sensor 14 for monitoring a battery temperature. When the battery temperature becomes lower than or equal to the predetermined temperature, the battery heater 15 is operated and thus the battery 11 is heated such that the battery temperature becomes higher than or equal to a target temperature. Battery heater 15 receives electric power from the battery 11 or the charger 22, and operates.

For the purpose of reduced vehicle costs, it is necessary to use a small-power heater of a minimum required heater output that the battery 11 can be kept warm than the target temperature. In such a case, a heater operating time for rising a temperature of battery 11 tends to lengthen, and hence the opportunities that the charging action of the battery and the heating action of the battery occur in concurrence with each other tend to increase. In particular, in the case of a timed charge, corresponding to a charge mode used mainly in a low-cost night electric-power time slot, the battery temperature often falls. In such a case, it is predicted that the charging action of the battery and the heating action of the battery occur in concurrence with each other. Assuming that the charging action of the battery and the heating action of the battery have occurred in concurrence with each other, a charge power shortfall occurs by an electric power consumed by the battery heater 15, since an upper limit of the output of charger 22 is determined depending on electric power from the external power source. Therefore, in the first embodiment, the charge controller 21 is configured to delay the charge suspension time set up now, when the heating of the battery is carried out during charging, thereby preventing a charge power shortfall.

Figure 2:
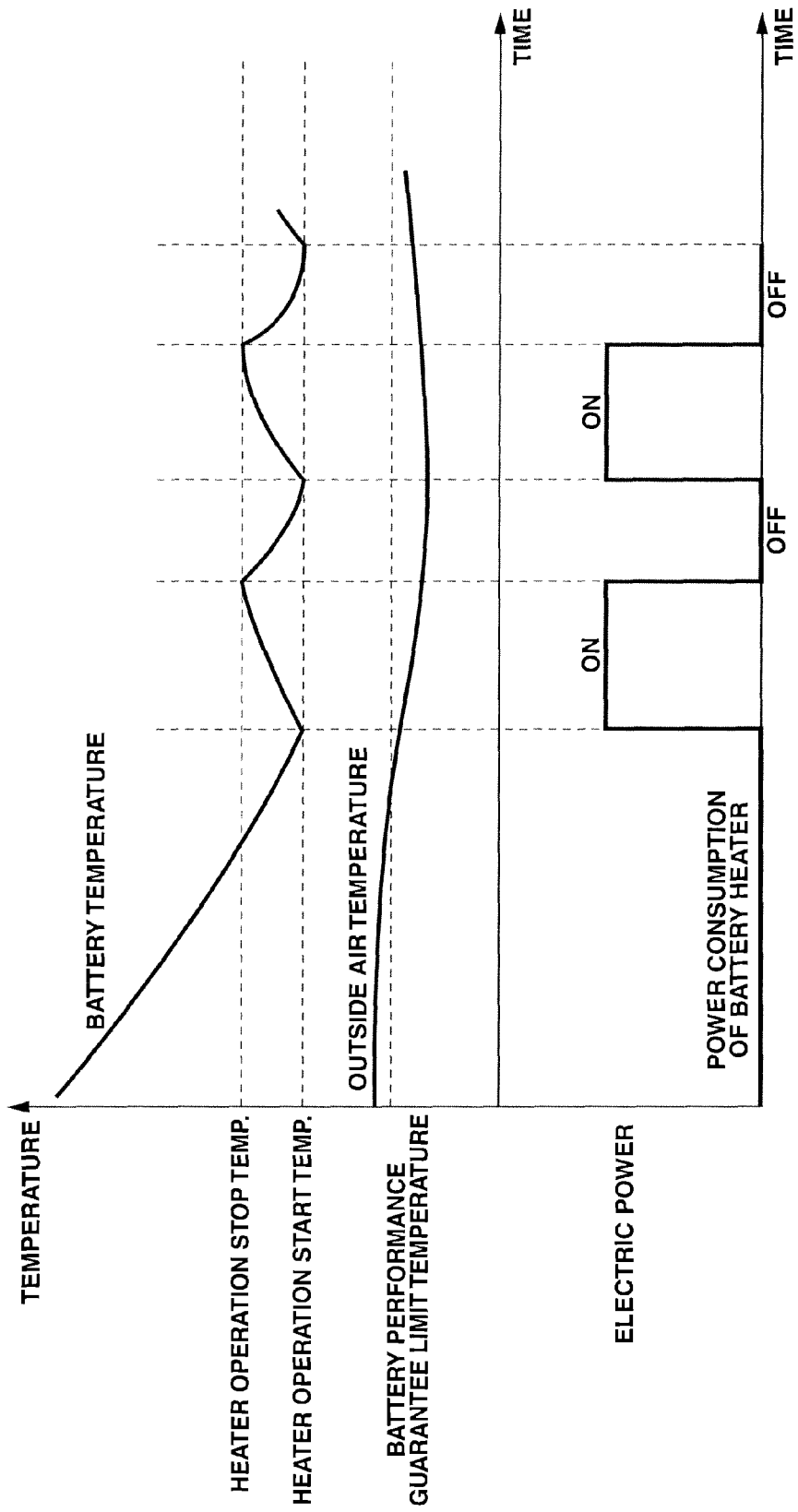
FIG. 2 is a time chart illustrating a variation in battery temperature and a behavior (a variation) in a power consumption of a battery heater, during operation of the battery heater incorporated in the system of the first embodiment.

FIG. 2 is the time chart illustrating a variation in battery temperature and a behavior (a variation) in a power consumption of the battery heater, during operation of the battery heater incorporated in the system of the first embodiment. At the time of the run end of the vehicle, owing to heat generation of battery 11, arising from an electric discharge during running, the temperature of battery 11 becomes higher than the outside air temperature. Thereafter, the temperature of battery 11 gradually falls toward the outside air temperature, while the vehicle is left as it is. When the outside air temperature is very low, in order to prevent the battery temperature from reaching a battery performance guarantee limit temperature corresponding to a battery performance degradation temperature and an electrolyte freeze temperature in the battery 11, the heating of the battery is performed by the battery heater 15.

Regarding the battery heater 15, usually, a heater operation start temperature and a heater operation stop temperature higher than the heater operation start temperature are both preset. The operation of battery heater 15 is started when the temperature of battery 11, detected by the battery temperature sensor 14, reaches the operation start temperature, and thereafter the operation of battery heater 15 is stopped at the time when the battery temperature has been risen up to the operation stop temperature, and whereby the battery 11 is kept warm than the predetermined temperature. In the case that the battery heater 15 is a small-power type, it usually takes several hours until the battery temperature rises from the battery-heater operation start temperature to the operation stop temperature. Also, several hours are usually required until the battery temperature cools off from the operation stop temperature to the operation start temperature. The operation of battery heater 15 is performed based on the battery temperature, and thus performed independently of a state of charge of battery 11. Therefore, even when the charge system is in its sleep state, it is necessary to check an operating state of the battery heater 15 periodically or irregularly.

Figure 3:
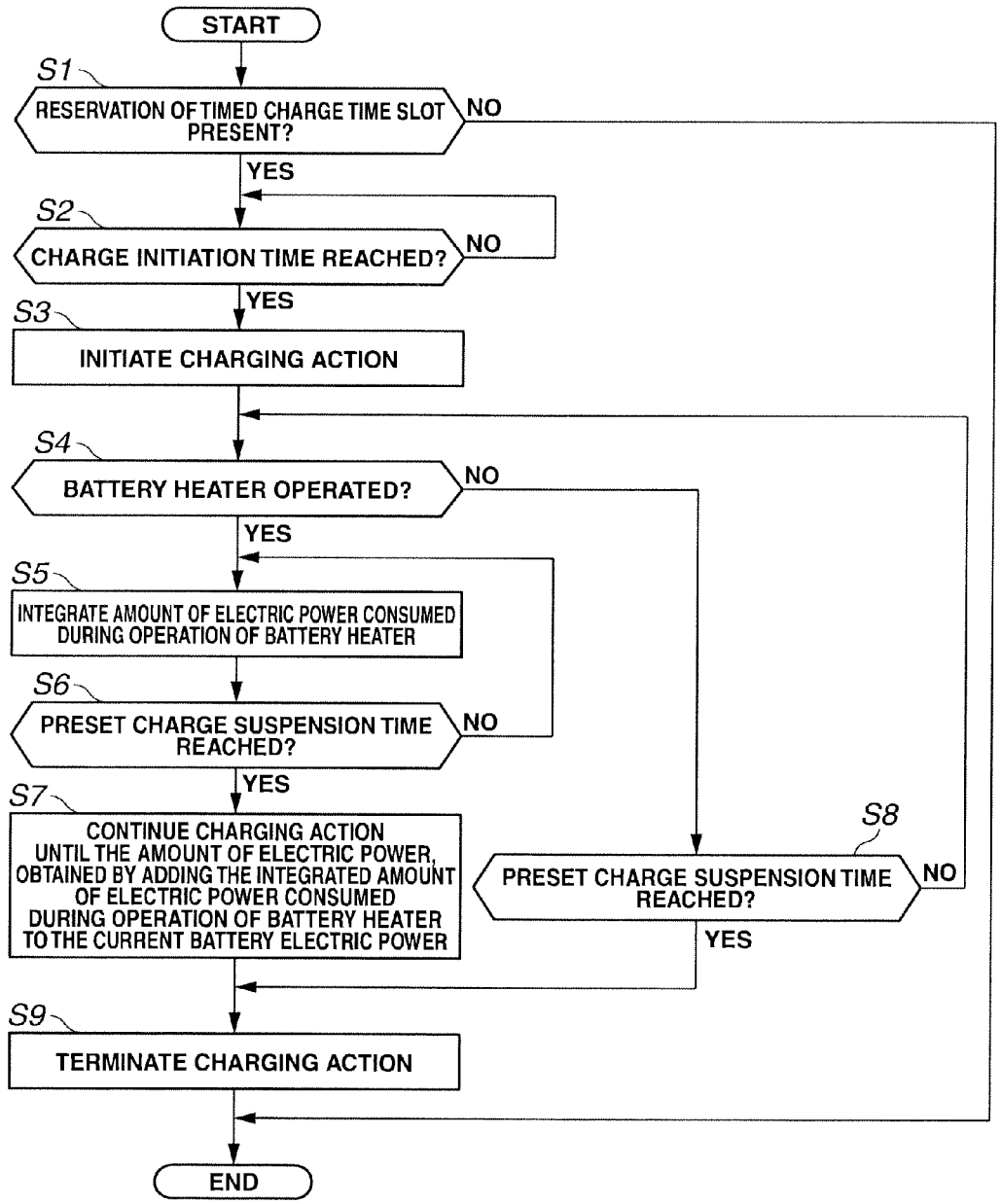
FIG. 3 is a flowchart illustrating a timed-charge period control processing, executed within the charge control device of the first embodiment.

FIG. 3 is the flowchart illustrating the timed-charge period control processing, executed within the charge control device of the first embodiment.

At step S1, a check is made to determine whether a reservation about a timed-charge time slot is present or absent. In the absence of such a reservation, the control routine (the control flow) terminates. Conversely in the presence of such a reservation, the routine proceeds to step S2.

At step S2, a check is made to determine whether a charge initiation time has been reached. When the charge initiation time has been reached, the routine proceeds to step S3. Conversely when the charge initiation time has not yet been reached, this step S2 is repeatedly executed. By the way, at this time the charge system is in its sleep state, but the charge system can start up immediately when a check time has been reached, so as to check various check items.

At step S3, a charging action is initiated, since the charge initiation time has been reached.

At step S4, a check is made to determine whether the battery heater 15 is being operated during charging. When it has been determined that the heater is being operated, the routine proceeds to step S5. Conversely when not yet operated, the routine proceeds to step S8.

At step S5, an amount of electric power consumed during operation of the battery heater is integrated.

At step S6, a check is made to determine whether a preset charge suspension time has been reached. When the preset charge suspension time has been reached, the routine proceeds to step S7. Conversely when not yet been reached, the routine returns to step S5, so as to repeatedly execute the integration of the amount of electric power consumed.

At step S7, the charging action is continued until an amount of electric power, obtained by adding the integrated amount of electric power consumed during operation of the battery heater to the current battery electric power. Immediately when the battery charging has been completed, the routine proceeds to step S9, so as to terminate the charging action.

At step S8, a check is made to determine whether the preset charge suspension time has been reached. When it has been determined that the preset charge suspension time has been reached, the routine proceeds to step S9, so as to terminate the charging action. Conversely when not yet reached, the routine returns again to step S4, so as to continually check the presence or absence of an operating state of the battery heater 15.

Figure 4:
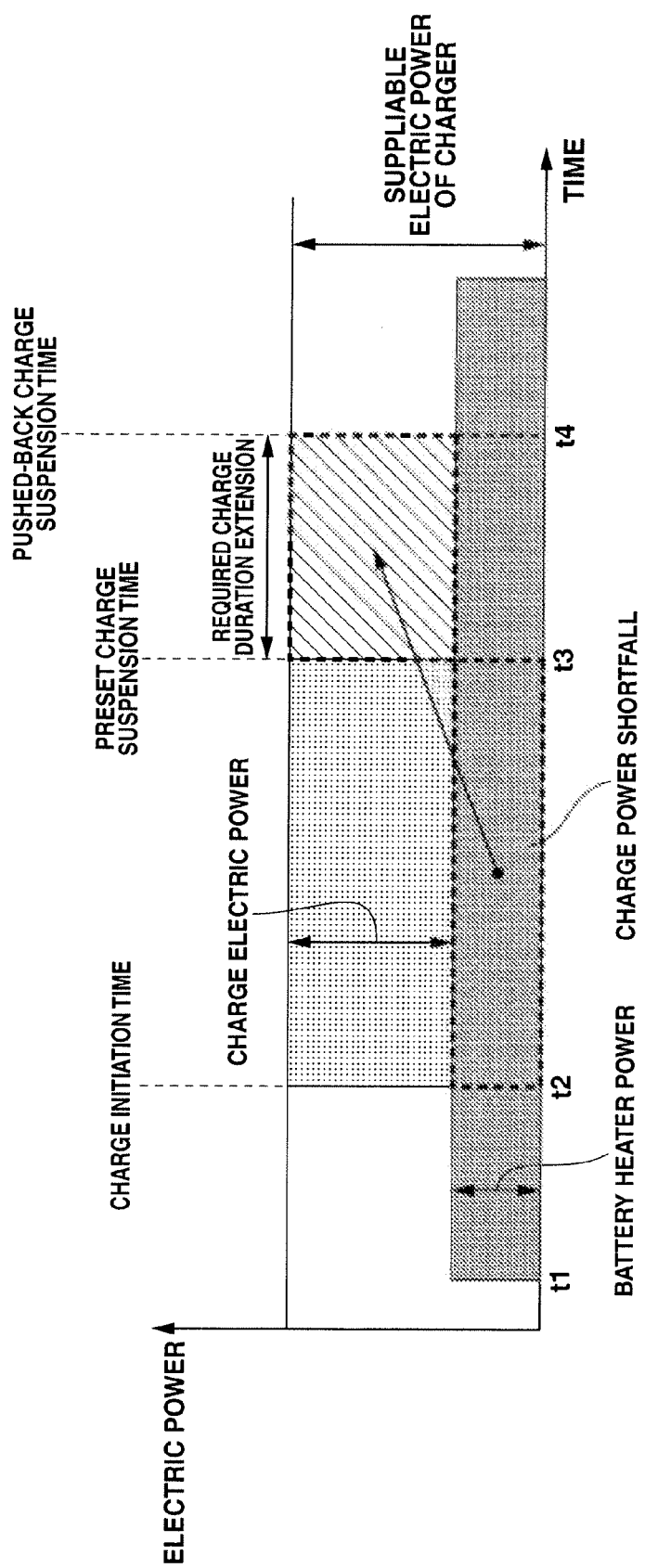
FIG. 4 is a time chart illustrating an example of the timed-charge period control processing of the first embodiment.

Referring to FIG. 4, there is shown the time chart illustrating an example of the timed-charge period control processing of the first embodiment. Assume that, at the initial part of the time chart, the external power source 50 and the electrically-driven vehicle 100 have been connected to each other via the charging cable 40 by a user, and then a charge initiation time and a charge suspension time have already been set by the user with the interface device 25. There is a limit to the electric power that can be supplied from the external power source 50. Electric-power supply is carried out within the power limit. At this time, assume that the outside air temperature is lower than the battery performance guarantee limit temperature, in other words, the temperature of battery 11 is lower than the heater operation start temperature, due to the vehicle left as it is.

At the time t1, the battery heater 15 comes into operation, because of the battery temperature lower than the heater operation start temperature, in a manner so as to begin to heat the battery 11. The point of time is still before the charge initiation time.

At the time t2, immediately when the charge initiation time has been reached, a charging action is initiated. At this time, the battery heater 15 is continuously operated, and thus a charge power shortfall occurs by an electric power consumed by the battery heater 15. The consumed electric power is continuously integrated during charging.

At the time t3, immediately when the preset charge suspension time has been reached, in order to complement a charge amount corresponding to the integrated amount of electric power consumed, the charging action is continued. Hence, even when the battery heater 15 is operated during the timed-charge and thus a charge power shortfall occurs, an appropriate charge amount can be ensured by delaying the charge suspension time.

At the time t4, immediately when the required charge time duration has expired, the charging action is stopped or suspended.

Referring to FIG. 5, there is shown the time chart illustrating another example of the timed-charge period control processing of the first embodiment. This time chart is basically similar to that shown in FIG. 4, but different therefrom in that the battery heater 15 is not yet operated at the charge initiation time and thereafter the battery heater 15 begins to operate at the time t21 during charging. Also in such a case, the integration of the amount of electric power consumed is initiated at the same time that the battery heater 15 comes into operation, and then the charge suspension time can be delayed depending on the integrated amount, thus ensuring an appropriate charge amount.

As discussed above, the first embodiment can provide the following operation and effects.

(1) A charge control device is provided with a battery 11 for charging or discharging electricity, a battery heater 15 for heating the battery 11, a battery temperature sensor 14 (a battery temperature detection means) for detecting a temperature of the battery 11, a battery controller 12 (a battery control means) configured to control the battery heater 15, while monitoring a temperature condition of the battery 11, to carry out heating of the battery, a charger 22 for supplying electric power to both the battery 11 and the battery heater 15, an interface device 25 (a timed charge reservation means) via which a given charge time slot and a target charge amount can be arbitrarily specified by a user, and a charge controller 21 (a charge control means) configured to carry out a timed charge in the charge time slot specified via the interface device 25. The charge controller 21 is configured to delay a charge suspension time of the charge time slot when the heating of the battery is being carried out during the timed charge.

That is, even when the timed charge and the heating of the battery are carried out in concurrence with each other and hence a charge power drop occurs, it is possible to extend a charge time duration by delaying the charge suspension time, thus avoiding a charge power shortfall. Additionally, the heating of the battery can be carried out during the timed charge, thereby eliminating the necessity of increasing a required capacity of the battery heater 15, and thus avoiding costs from being increased. Furthermore, the charging of the battery can be performed, while activating the battery heater 15 during charging, and therefore it is possible to avoid a charging efficiency from being lowered.

(2) The charge controller 21 is further configured to delay the charge suspension time until such time that an amount of electric power, consumed when the heating of the battery is being carried out during the timed charge, has been complementarily charged. That is, by complementing the amount of electric power consumed by the battery heater 15 during the timed charge, it is possible to ensure an appropriate charge amount without delaying the charge time duration wastefully.

While the foregoing is a description of the embodiment carried out the invention, it will be understood that the invention is not limited to the particular embodiments shown and described herein, but that various changes and modifications may be made without departing from the scope of the invention. In the first embodiment, the vehicle is exemplified in an electrically-driven vehicle, but the inventive concept may be applied to a plug-in hybrid vehicle. Also, the device of the shown embodiment is configured to delay a charge suspension time by an integrated amount of electric power consumed by the battery heater 15. In lieu thereof, in order to more certainly complete a charging action, a safety factor may be taken into account such that the charge suspension time can be delayed by a charge time duration extension that a safety margin is added.

The invention claimed is:

1. A charge control device for a vehicle comprising:
a battery for charging or discharging electricity;
a battery heater for heating the battery;
a battery temperature detection means for detecting a temperature of the battery;

a battery control means configured to control the battery heater, while monitoring a temperature condition of the battery, to carry out heating of the battery;

a charger for supplying electric power to both the battery and the battery heater;

a timed charge reservation means via which a given charge time slot and a target charge amount can be arbitrarily specified by a user; and a charge control means configured to carry out a timed charge in the charge time slot specified via the timed charge reservation means, wherein the charge control means is configured to delay a charge suspension time of the charge time slot when the heating of the battery is being carried out during the timed charge.

2. The charge control device for a vehicle as claimed in claim 1, wherein:

the charge control means is further configured to delay the charge suspension time until such time that an amount of electric power, consumed when the heating of the battery is being carried out during the timed charge, has been complementarily charged.

3. A charge control device for a vehicle comprising:

a battery for charging or discharging electricity;

a battery heater for heating the battery;

a battery temperature sensor for detecting a temperature of the battery;

a battery controller configured to control the battery heater, while monitoring a temperature condition of the battery, to carry out heating of the battery;

a charger for supplying electric power to both the battery and the battery heater;

an interface device via which a given charge time slot and a target charge amount can be arbitrarily specified by a user; and a charge controller configured to carry out a timed charge in the charge time slot specified via the interface device, wherein the charge controller is configured to delay a charge suspension time of the charge time slot when the heating of the battery is being carried out during the timed charge.

4. The charge control device for a vehicle as claimed in claim 3, wherein:

the charge controller is further configured to delay the charge suspension time until such time that an amount of electric power, consumed when the heating of the battery is being carried out during the timed charge, has been complementarily charged.

\* \* \* \* \*